(12) United States Patent
Kazama

(10) Patent No.: US 9,569,567 B2
(45) Date of Patent: Feb. 14, 2017

(54) SIMULATION METHOD AND SIMULATION DEVICE

(71) Applicant: FUJITSU LIMITED, Kawasaki-shi, Kanagawa (JP)

(72) Inventor: Masaki Kazama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 580 days.

(21) Appl. No.: 14/090,161

(22) Filed: Nov. 26, 2013

(65) Prior Publication Data

US 2014/0214378 A1    Jul. 31, 2014

(30) Foreign Application Priority Data

Jan. 30, 2013  (JP) ................................. 2013-016156

(51) Int. Cl.
G06F 17/50 (2006.01)

(52) U.S. Cl.
CPC ....... *G06F 17/5009* (2013.01); *G06F 2217/16* (2013.01)

(58) Field of Classification Search
USPC ... 703/2, 12; 204/450, 547; 428/403; 424/85
See application file for complete search history.

(56) References Cited

U.S. PATENT DOCUMENTS

| | | | | |
|---|---|---|---|---|
| 8,753,497 B2* | 6/2014 | Aubry | ..................... | B03C 5/005 204/450 |
| 2002/0157478 A1* | 10/2002 | Seale | ....................... | G01N 3/00 73/789 |
| 2009/0024376 A1 | 1/2009 | Hori et al. | | |
| 2009/0143987 A1 | 6/2009 | Bect et al. | | |
| 2010/0215961 A1* | 8/2010 | Aubry | ..................... | B03C 5/026 428/403 |
| 2011/0293558 A1* | 12/2011 | Suresh | .............. | B01L 3/502746 424/85.2 |
| 2012/0064505 A1* | 3/2012 | Suresh | .............. | B01L 3/502746 435/2 |
| 2013/0306479 A1* | 11/2013 | Aubry | ..................... | B03C 5/005 204/547 |

FOREIGN PATENT DOCUMENTS

| | | |
|---|---|---|
| JP | 2009-026279 | 2/2009 |
| JP | 2009-505260 | 2/2009 |

(Continued)

OTHER PUBLICATIONS

M. B. Liu et al., "Smoothed Particle Hydrodynamics (SPH): an Overview and Recent Developments," *Archives of Computational Methods in Engineering*, vol. 17, No. 1, pp. 25-76.

(Continued)

*Primary Examiner* — Thai Phan
(74) *Attorney, Agent, or Firm* — Staas & Halsey LLP

(57) ABSTRACT

A simulation device includes a deformation unit and a calculation unit. The deformation unit deforms a spherical potential region of each of a plurality of particles when a deformable continuum is represented by the plurality of particles into an ellipsoidal potential region based on the amount of deformation of each of the plurality of particles. The calculation unit calculates reaction force between the particles based on the potential region of each of the plurality of particles deformed into the ellipsoidal shape.

5 Claims, 7 Drawing Sheets

(56) References Cited

FOREIGN PATENT DOCUMENTS

JP         2011-013888      1/2011
WO    WO2007/020358 A3   2/2007

OTHER PUBLICATIONS

Extended European Search Report mailed Jul. 20, 2015 for European Patent Application No. 13194312.8.
Chinese Office Action dated Jun. 30, 2016 in corresponding Chinese Patent Application No. 201310625119.3.
Second Office Action, dated Dec. 12, 2016, in Chinese Application No. 201310625119.3 (11 pp.).

\* cited by examiner

SIMULATION METHOD AND SIMULATION DEVICE

CROSS-REFERENCE TO RELATED APPLICATION(S)

This application is based upon and claims the benefit of priority of the prior Japanese Patent Application No. 2013-016156, filed on Jan. 30, 2013, the entire contents of which are incorporated herein by reference.

FIELD

The embodiments discussed herein are related to a simulation method and a simulation device.

BACKGROUND

As a numerical calculation method of calculating the motion of a continuum, such as a fluid or an elastic body a finite difference method, a finite element method, or a finite volume method has been used which finds the approximate solution of a differential equation based on a numerical mesh. In addition, in recent years, since numerical calculation has been used in the field of application such as computer aided engineering (CAE), the numerical calculation method of calculating the state of the continuum has been developed and the problem of the interaction between a fluid and a structure has been solved. However, in the numerical calculation method using the numerical mesh, when a moving boundary problem, such as the existence of an interface including a free surface or a problem in fluid-structure interaction analysis for analyzing the interaction between a fluid and a structure, occurs, it is difficult to treat the continuum. Therefore, in some cases, it is difficult to create a program.

As the numerical calculation method without using the numerical mesh, there is a particle method. The particle method analyzes the motion of a continuum as the motion of a finite number of particles. A representative particle method which is currently proposed is, for example, a smoothed particle hydrodynamics (SPH) method or a moving particle semi-implicit (MPS) method. The particle method can analyze the motion of the continuum without a special measure in the treatment of the moving boundary. Therefore, in recent years, the particle method has been widely used as the numerical calculation method of calculating the motion of the continuum.

In the field of structure analysis, in some cases, the contact between objects, such as the collision between objects, is calculated. Software based on the finite element method, such as LS-DYNA (registered trademark), treats the contact problem from the geometrical shape of a numerical mesh. However, the particle method does not generate the numerical mesh. Therefore, in the calculation of the contact, when another particle enters a sphere with a predetermined radius $h_s$ from a particle, the particle method performs the calculation such that reaction force is applied to the particles. FIG. 8 is a diagram illustrating an example of the reaction force calculated by the conventional particle method. In the example illustrated in FIG. 8, a particle 91 is arranged in the radius $h_s$ of a particle 90. In the example illustrated in FIG. 8, the particle 90 is arranged in the radius $h_s$ of the particle 91. In the example illustrated in FIG. 8, the particle method calculates reaction force 90a applied from the particle 90 to the particle 91. In addition, the particle method calculates reaction force 91a applied from the particle 91 to the particle 90.

The particle method uses the following Equation (1) as a potential function applied to, for example, particles i and j.

$$\varphi_{ij}(|x_i - x_j|) = \begin{cases} c\log\left(\dfrac{|x_i - x_j|}{h_s}\right) & |x_i - x_j| < h_s \\ 0 & |x_i - x_j| \geq h_s \end{cases} \quad (1)$$

Herein, xi and xj are the position vectors of the particle i and the particle j, respectively. In addition, c is a constant.

The reaction force applied from the particle j to the particle i by the potential represented by Equation (1) is obtained as $$-\dfrac{\partial \varphi_{ij}}{\partial x_i} \quad \text{(Expression 2)}$$

and the reaction force applied from the particle i to the particle j by the potential is obtained as $$-\dfrac{\partial \varphi_{ij}}{\partial x_j}. \quad \text{(Expression 3)}$$

Another example of the particle method of calculating the contact is a method which calculates a contact point of a closed surface other than the sphere when the contact point of the particle is calculated.

With regard to the conventional technologies, refer to Japanese Laid-open Patent Publication No. 2009-26279, for example.

However, the conventional particle method represents the potential region in a spherical shape. Therefore, in the conventional particle method, when the contact problem between deformable bodies, such as elastic bodies, is treated, in some cases, the particle after deformation can infiltrate into the region, into which the particle could not infiltrate before deformation. In this case, since the calculation region of a given particle includes another particle, the accuracy of calculating reaction force is deteriorated in the conventional particle method. FIGS. 9 and 10 are diagrams illustrating an example of the problems of the conventional particle method. FIG. 9 illustrates an example of the arrangement of particles 80 of an elastic body before deformation at the beginning of the simulation by the conventional particle method. As illustrated in the example of FIG. 9, two particles 80 are arranged such that the regions thereof within radius $h_s$ overlap each other. Therefore, it is difficult for a particle 81 of an elastic body different from the elastic body including the particle 80 to infiltrate between the two particles 80.

FIG. 10 illustrates an example of the arrangement of the particles 80 of the elastic body after deformation in the middle of the simulation by the conventional particle method. As illustrated in the example of FIG. 10, two particles 80 are deformed in such a direction that they are kept separated from each other and that the regions thereof within the radius $h_s$ do not overlap each other. Therefore, a particle 81 of an elastic body different from the elastic body including the particle 80 can infiltrate between the two particles 80. When the particle 81 infiltrates between the two particles 80, the particle 80 is arranged on the calculation region of the particle 81 and the particle 81 is arranged on the calculation region of the particle 80. Therefore, in the example illustrated in FIG. 10, the accuracy of calculating reaction force is deteriorated.

SUMMARY

According to an aspect of an embodiment, a computer-readable recording medium has stored therein a simulation program. The simulation program causes a computer to perform a process including: deforming a spherical potential region of each of a plurality of particles when a deformable continuum is represented by the plurality of particles into an ellipsoidal potential region based on the amount of deformation of each of the plurality of particles; and calculating reaction force between the particles based on the potential region of each of the plurality of particles deformed into the ellipsoidal shape.

According to another aspect of an embodiment, a simulation method causes a computer to perform: deforming a spherical potential region of each of a plurality of particles when a deformable continuum is represented by the plurality of particles into an ellipsoidal potential region based on the amount of deformation of each of the plurality of particles; and calculating reaction force between the particles based on the potential region of each of the plurality of particles deformed into the ellipsoidal shape.

According to still another aspect of an embodiment, a simulation device includes a deformation unit and a calculation unit. The deformation unit deforms a spherical potential region of each of a plurality of particles when a deformable continuum is represented by the plurality of particles into an ellipsoidal potential region based on the amount of deformation of each of the plurality of particles. The calculation unit calculates reaction force between the particles based on the potential region of each of the plurality of particles deformed into the ellipsoidal shape.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings. The embodiments do not limit the disclosed technique.

Structure of Simulation device

Figure 1:
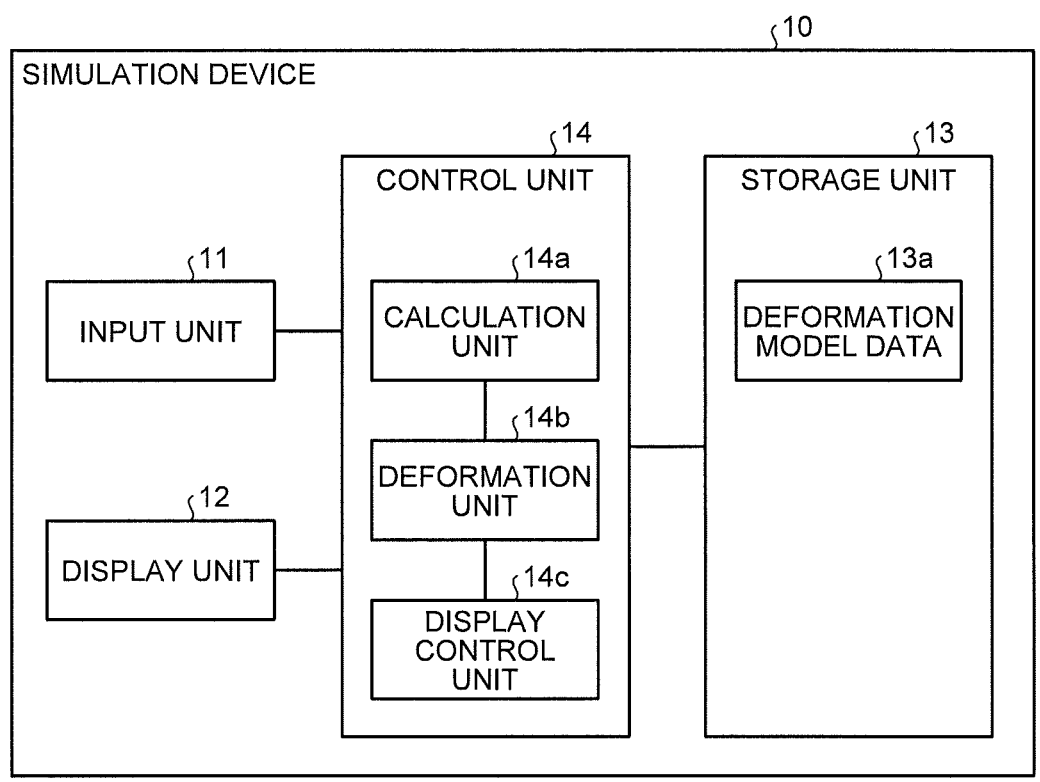
FIG. 1 is a diagram illustrating an example of a functional structure of a simulation device according to an embodiment.

The simulation device according to the embodiment will be described. The simulation device according to this embodiment calculates the contact between a deformable object, such as an elastic body, an elasto-plastic body, or a viscoelastic body, and other deformable objects. The simulation device according to this embodiment calculates the position, velocity, acceleration, deformation gradient tensor, temperature, and density of each particle at each time step $t_{ts}$. FIG. 1 is a diagram illustrating an example of the functional structure of the simulation device according to the embodiment. As illustrated in FIG. 1, a simulation device 10 includes an input unit 11, a display unit 12, a storage unit 13, and a control unit 14.

The input unit 11 inputs information to the control unit 14. For example, the input unit 11 receives a simulation execution instruction to perform a simulation process, which will be described below, from the user and inputs the received simulation execution instruction to the control unit 14. In addition, the input unit 11 receives the initial value of each particle in an initial state from the user and inputs the received initial value of each particle to the control unit 14. The initial value of each particle in the initial state includes the position, velocity, acceleration, deformation gradient tensor, temperature, and density of each particle. An example of a device of the input unit 11 is a keyboard or a mouse.

The display unit 12 displays various kinds of information. For example, the display unit 12 displays the simulation result under the control of a display control unit 14*c*, which will be described below. An example of a device of the display unit 12 is a liquid crystal display.

The storage unit 13 stores various programs executed by the control unit 14. In addition, the storage unit 13 stores deformation model data 13*a*. The deformation model data 13*a* indicates a model in which a deformable continuum, such as an elastic body, an elasto-plastic body, or a viscoelastic body, is represented by a plurality of particles.

Returning to FIG. 1, the storage unit 13 is a semiconductor memory device, such as a flash memory, or a storage device, such as a hard disk or an optical disk. The storage unit 13 is not limited to the various types of storage devices described above, but may be a random access memory (RAM) or a read only memory (ROM).

The control unit 14 includes an internal memory for storing a program or control data which defines various types of processes, and various types of processes are performed by the program or control data. As illustrated in FIG. 1, the control unit 14 includes a calculation unit 14*a*, a deformation unit 14*b*, and the display control unit 14*c*.

The calculation unit 14*a* calculates various kinds of information. For example, the calculation unit 14*a* calculates the position, velocity, acceleration, deformation gradient tensor, temperature, and density of each particle at each time step $t_{ts}$. In addition, the calculation unit 14*a* calculates reaction force between particles based on a potential region of each of a plurality of particles which are deformed in an ellipsoidal shape by the deformation unit 14b, which will be described below.

An aspect of the calculation unit 14a will be described. For example, when the simulation execution instruction is input from the input unit 11, first, the calculation unit 14a sets the value of the time step $t_{ts}$ to 0. Then, the calculation unit 14a determines whether the initial value of each particle is input from the input unit 11. When the initial value is input, the calculation unit 14a increases the value of the time step $t_{ts}$ by 1. In addition, even when the display control unit 14c determines that the value of the time step $t_{ts}$ is equal to or less than the last time step $N_L$ of the simulation, the calculation unit 14a increases the value of time step $t_{ts}$ by 1.

Then, the calculation unit 14a calculates force, for example, stress or external force applied to each particle at the time step $t_{ts}$.

Figure 3:
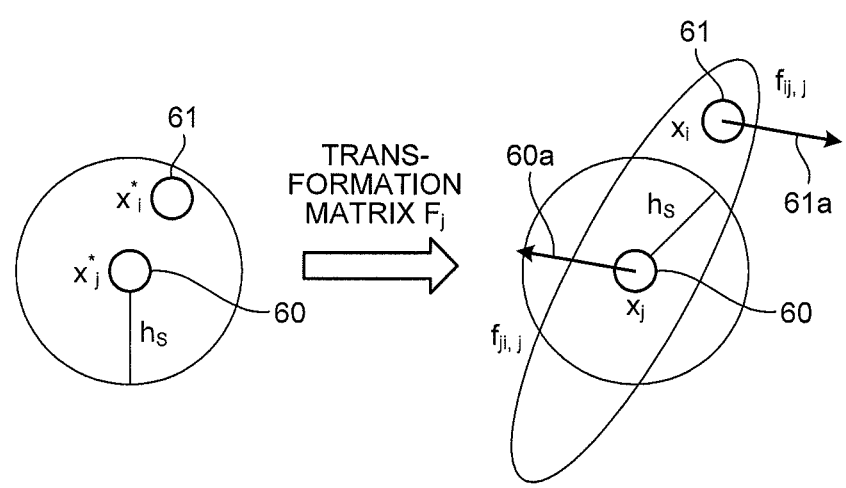
FIG. 3 is a diagram illustrating an example of the process performed by the simulation device according to the embodiment.

Then, the calculation unit 14a determines whether there is a particle which has not been selected as a particle j among all particles. When there is a particle which has not been selected as the particle j, the calculation unit 14a selects one of the particles which have not been selected, as the particle j. The calculation unit 14a determines whether there is a particle which has not been selected as a particle i among the particles other than the particle which is newly selected as the particle j from all particles. When there is a particle which has not been selected as the particle i, the calculation unit 14a selects one of the particles which have not been selected, as the particle i. With reference to FIG. 3, an example of process executed by the calculation unit 14a is described. FIG. 3 is a diagram illustrating an example of the process performed by the simulation device according to the embodiment. In the example of FIG. 3, a particle 61 corresponds to particle i, and a particle 60 corresponds to particle j. As illustrated in FIG. 3, it is assumed that the position vector of the particle i after deformation is $x_i$ and the position vector of the particle i before deformation is $x_i^*$. In this embodiment, each particle has a deformation gradient tensor indicating the amount of deformation. For example, it is assumed that the particle i has a deformation gradient tensor $F_i$. In this embodiment, after the force applied to each particle is calculated, the calculation unit 14a and the deformation unit 14b calculate reaction force applied to each particle.

The deformation unit 14b will be described. For example, as illustrated in the example of FIG. 3, when the calculation unit 14a selects a particle which has not been selected, as the particle i (particle 61), the deformation unit 14b calculates a relative position vector $x_{ij,j}^*$ in a coordinate system before deformation using the deformation gradient tensor $F_j$ of the particle j (particle 60) according to the following Equation (2).

$$x^*_{ij,j} = F_j^{-1} x_{ij} \quad (2)$$

The relative position vector between the particle i and the particle j satisfies $x_{ij} = x_i - x_j$. Since the particle j is deformed depending on the deformation gradient tensor $F_j$, a relative position vector indicating the relative distance between the particle i and the particle j in a state in which the particle j is not changed is calculated by reverse conversion indicated by Equation (2).

Then, the deformation unit 14b defines reaction force potential from the particle j using the following Equation (3).

$$\varphi_{ij,j}(|x^*_{ij,j}|) = \begin{cases} c_{ij,j} \log\left(\frac{|x^*_{ij,j}|}{h_s}\right) & |x^*_{ij,j}| < h_s \\ 0 & |x^*_{ij,j}| \geq h_s \end{cases} \quad (3)$$

Herein, $c_{ij,j}$ is a constant.

Figure 2:
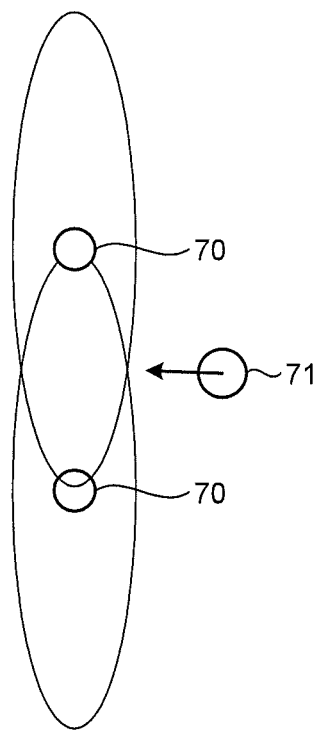
FIG. 2 is a diagram illustrating an example of a process performed by the simulation device according to the embodiment.

As described above, the deformation unit 14b calculates the relative position vector $x_{ij,j}^*$ in the coordinate system before deformation using Equation (2) and defines the reaction force potential from the particle j using Equation (3). Then, the deformation unit 14b deforms a spherical potential region of the particle j into an ellipsoidal shape, depending on the amount of deformation of the particle j. For example, the deformation unit 14b deforms the spherical potential region of the particle j into the ellipsoidal shape, using the deformation gradient tensor $F_j$ of the particle j. FIG. 2 is a diagram illustrating an example of the process performed by the simulation device according to the embodiment. In the example illustrated in FIG. 2, a particle 70 corresponds to the particle j. As illustrated in the example of FIG. 2, according to this embodiment, the shape of the potential region of the particle 70 is deformed into an ellipsoidal shape. In addition, as illustrated in the example of FIG. 2, when the shape of the potential region of the particle 70 is deformed into the ellipsoidal shape, it is difficult for a particle 71 to infiltrate into the potential region. Therefore, according to this embodiment, it is possible to prevent the particle 71 from existing in the calculation region of the particle 70. As a result, according to this embodiment, it is possible to calculate reaction force with high accuracy.

Then, the calculation unit 14a calculates force $f_{ij,j}$ applied to the particle i from the potential gradient calculated by Equation (3) based on the following Equation (4). For example, in the example as illustrated in FIG. 3, the calculation unit 14a calculates a force $f_{ij,j}$ (indicated by numeral 61a in FIG. 3) applied to the particle i (particle 61) based on the following Equation (4).

$$f_{ij,j} = -\frac{\partial \varphi_{ij,j}(|x^*_{ij,j}|)}{\partial x_i} \quad (4)$$

$$= -\frac{\partial x^*_{i,j}}{\partial x_i} \frac{\partial \varphi_{ij,j}(|x^*_{ij,j}|)}{\partial x^*_{i,j}}$$

$$= -F_j^{-1} \frac{x^*_{ij,j}}{|x^*_{ij,j}|} \varphi'_{ij,j}(|x^*_{ij,j}|)$$

Herein, $x_{i,j}^* = F_j^{-1} x_i$ is established. In addition, it is assumed that force $f_{ji,j} = -f_{ij,j}$ which has the same strength as the force represented by Equation (4) and has a direction opposite to that of the force $_{ji,j}$ is applied as reaction force to the particle j. For example, in the example illustrated in FIG. 3, the force $f_{ij,j}$ is indicated by numeral 60a, and the force $f_{ji,j} = -f_{ij,j}$ which has the same strength as, and has a direction opposite to the force $f_{ij,j}$ (indicated by numeral 61a in FIG. 3) is applied to the particle j (particle 60) as the reaction. The calculation unit 14a calculates reaction force $f_{c,ij}$ applied from the particle j to the particle i based on the following Equation (5), considering the reaction of reaction force applied from the particle i to the particle j.

$$f_{c,ij} = f_{ij,j} - f_{ji,i} \quad (5)$$

Then, the calculation unit 14a performs again the process subsequent to the process of determining whether there is a particle which has not been selected as the particle i among the particles other than the particle which is newly selected as the particle j from all particles. In this way, the calculation unit 14a can calculate the reaction force applied to all particles other than the particle j from the particle which has been selected as the particle j.

In the process of determining whether there is a particle which has not been selected as the particle i among the particles other than the particle which is newly selected as the particle j from all particles, when it is determined that there is no particle which has not been selected as the particle i, the calculation unit 14a performs the next process. That is, the calculation unit 14a determines that all particles have not been selected as the particle i. Then, the calculation unit 14a performs again the process subsequent to the process of determining whether there is a particle which has not been selected as the particle j among all particles. In this way, the reaction force between all particles is calculated.

When it is determined that there is no particle which has not been selected as the particle j among all particles, the calculation unit 14a calculates the acceleration of each particle at the time step $t_{ts}$ from the force applied to each particle.

Then, the calculation unit 14a updates the velocity of each particle with the velocity calculated from the acceleration of each particle. Then, the calculation unit 14a updates the position of each particle with the position calculated from the velocity of each particle. Then, the calculation unit 14a updates the deformation gradient tensor of each particle with the amount of deformation of each particle calculated from the velocity. Then, the calculation unit 14a stores the update results of all particles and the time step $t_{ts}$ in the storage unit 13 so as to be associated with each other.

The display control unit 14c controls the display of various kinds of information. An aspect of the display control unit 14c will be described. For example, when the calculation unit 14a stores the update results of all particles and the time step $t_{ts}$ in the storage unit 13 so as to be associated with each other, the display control unit 14c determines whether the value of the time step $t_{ts}$ is equal to or less than the last time step $N_L$ of the simulation. When the value of the time step $t_{ts}$ is not equal to or less than the last time step $N_L$ of the simulation, the display control unit 14c performs the next process. That is, the display control unit 14c acquires the update results of all particle, which are stored in the storage unit 13 so as to be associated with each time step, for all time steps. Then, the display control unit 14c controls the display of the display unit 12 such that the simulation result (the update results of all particles at all time steps) is displayed.

The control unit 14 is a hard-wired logic, such as an application specific integrated circuit (ASIC) or a field programmable gate array (FPGA). Alternatively, a central processing unit (CPU) or a micro processing unit (MPU) executes a program to implement the function of the control unit 14.

Figure 4:
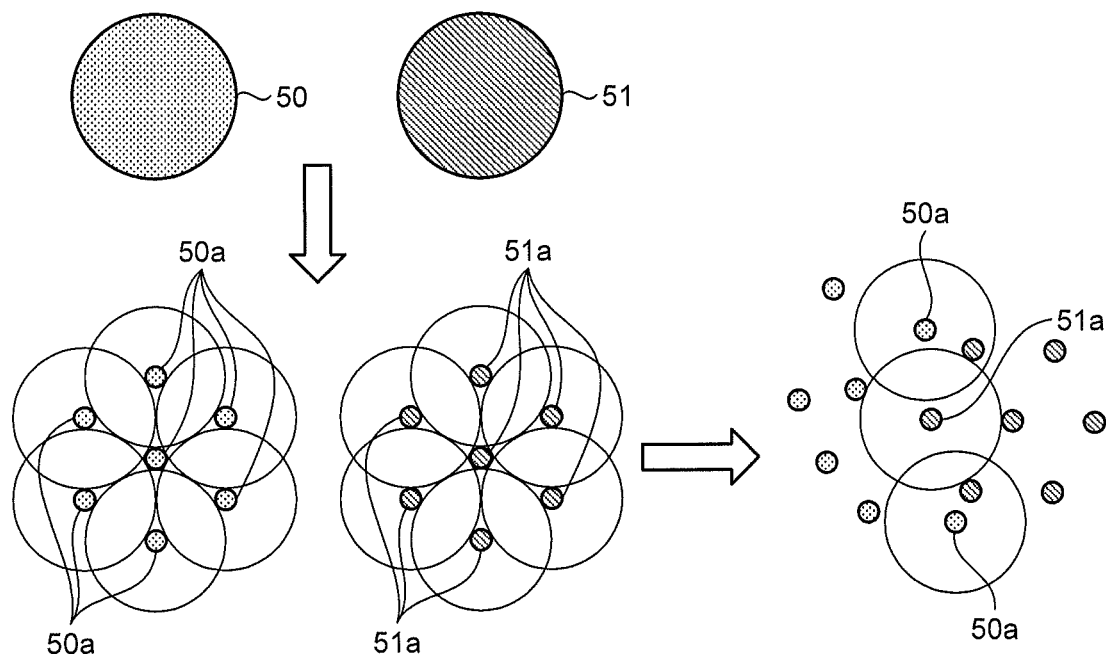
FIG. 4 is a diagram illustrating an example of a process according to a conventional particle method.

Next, an example of a process when the conventional particle method is used will be described. FIG. 4 is a diagram illustrating an example of the process when the conventional particle method is used. In the example illustrated in FIG. 4, an elastic body 50 is discretized (divided into particles) to generate a model including a plurality of particles 50a and an elastic body 51 is discretized to generate a model including a plurality of particles 51a. In the conventional particle method, when the model of the elastic body 50 including the plurality of particles 50a collides with the model of the elastic body 51 including the plurality of particles 51a to calculate deformation, for example, two particles 50a are deformed so as to be away from each other, as illustrated in FIG. 4. In this case, as illustrated in FIG. 4, the particle 51a can infiltrate between two particles 50a. That is, the particle 51a does not receive reaction force from the particle 50a. In this case, the particle 50a is disposed on a calculation region of the particle 51a and the particle 51a is disposed on a calculation region of particle 50a. Therefore, in the conventional particle method, the accuracy of calculating, for example, reaction force is reduced.

In contrast, according to this embodiment, as illustrated in the example of FIG. 2, even when the distance between the particles increases due to the deformation of the particles, it is possible to prevent other particles from being disposed in the calculation region since the spherical potential region of each particle is deformed into an ellipsoidal shape. Therefore, in this embodiment, it is possible to calculate reaction force with high accuracy.

Flow of Process

Figure 5:
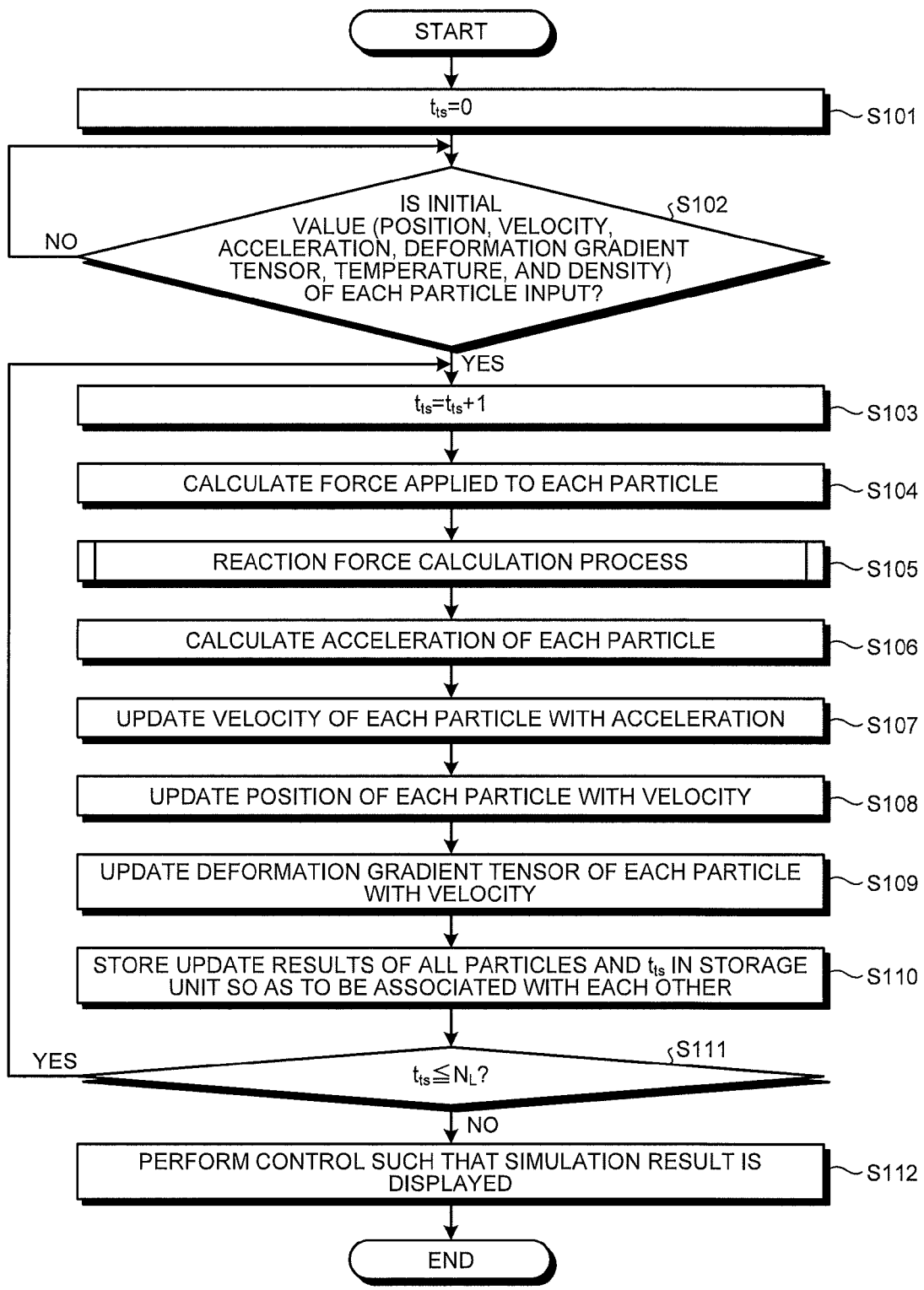
FIG. 5 is a flowchart illustrating the procedure of a simulation process according to the embodiment.

Next, the flow of the process of the simulation device 10 according to this embodiment will be described. FIG. 5 is a flowchart illustrating the procedure of a simulation process according to the embodiment. The simulation process can be performed at various times. For example, the control unit 14 performs the simulation process when the simulation execution instruction to perform the simulation process is input from the input unit 11.

As illustrated in FIG. 5, the calculation unit 14a sets the value of the time step $t_{ts}$ to 0 (S101). Then, the calculation unit 14a determines whether the initial value of each particle is input from the input unit 11 (S102). When the initial value is not input (No in S102), the calculation unit 14a performs again the determination in S102. On the other hand, when the initial value is input (Yes in S102), the calculation unit 14a increases the value of the time step $t_{ts}$ by 1 (S103).

Then, the calculation unit 14a calculates force, for example, stress or external force applied to each particle at the time step $t_{ts}$ (S104). Then, the calculation unit 14a performs a reaction force calculation process (S105). Then, the calculation unit 14a calculates the acceleration of each particle at the time step $t_{ts}$ from the force applied to each particle (S106).

Then, the calculation unit 14a updates the velocity of each particle with the velocity calculated from the acceleration of each particle (S107). Then, the calculation unit 14a updates the position of each particle with the position calculated from the velocity of each particle (S108). Then, the calculation unit 14a updates the deformation gradient tensor of each particle with the amount of deformation of each particle calculated from the velocity (S109). Then, the calculation unit 14a stores the update results of all particles and the time step $t_{ts}$ in the storage unit 13 so as to be associated with each other (S110).

The display control unit 14c determines whether the value of the time step $t_{ts}$ is equal to or less than the last time step $N_L$ of the simulation (S111). When the value of the time step $t_{ts}$ is equal to or less than the last time step $N_L$ of the simulation (Yes in S111), the process returns to S103. On the other hand, when the value of the time step $t_{ts}$ is not equal to or less than the last time step $N_L$ of the simulation (No in S111), the display control unit 14c performs the next process. That is, the display control unit 14c acquires the update results of all particles at each time step which are stored in the storage unit 13 for all time steps. Then, the display control unit 14c controls the display of the display unit 12 such that the simulation results (the update results of all particles at all time steps) are displayed (S112) and the process ends.

Figure 6:
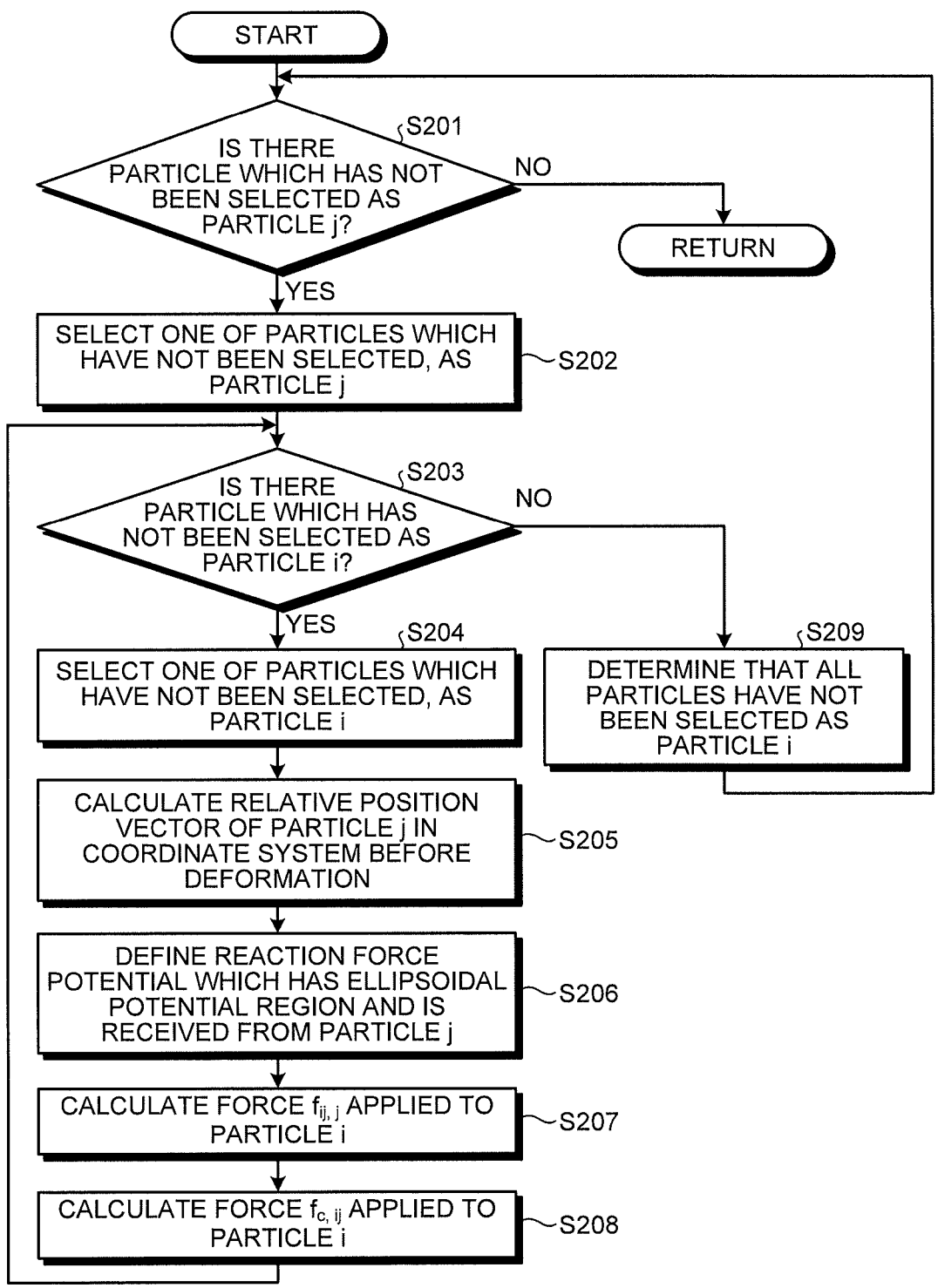
FIG. 6 is a flowchart illustrating the procedure of a reaction force calculation process according to the embodiment.

FIG. 6 is a flowchart illustrating the procedure of the reaction force calculation process according to the embodiment. As illustrated in FIG. 6, the calculation unit 14a determines whether there is a particle which has not been selected as the particle j among all particles (S201). When there is a particle which has not been selected as the particle j (Yes in S201), the calculation unit 14a selects one of the particles which have not been selected, as the particle j (S202). Then, the calculation unit 14a determines whether there is a particle which has not been selected as the particle i among the particles other than the particle which has been newly selected as the particle j from all particles (S203). When there is a particle which has not been selected as the particle i (Yes in S203), the calculation unit 14a selects one of the particles which have not been selected, as the particle i (S204).

The deformation unit 14b calculates the relative position vector $x_{ij,j}^*$ in the coordinate system before deformation using the deformation gradient tensor $F_j$ of the particle j according to Equation (2) (S205). Then, the deformation unit 14b defines the reaction force potential from the particle j using Equation (3) (S206).

Then, the calculation unit 14a calculates the force $f_{ij,j}$ applied to the particle i from the potential gradient calculated by Equation (3) based on Equation (4) (S207). Then, the calculation unit 14a calculates the reaction force $f_{c,ij}$ applied from the particle i to the particle j based on Equation (5), considering the reaction of reaction force applied from the particle i to the particle j (S208). Then, the process returns to S203.

On the other hand, when there is no particle which has not been selected as the particle i (No in S203), the calculation unit 14a determines that all particles have not been selected as the particle i (S209) and the process returns to S201.

When there is no particle which has not been selected as the particle j (No in S201), the calculation unit 14a stores the processing result in the internal memory and returns to the process.

As described above, the simulation device 10 according to this embodiment deforms the spherical potential region of each of a plurality of particles when a deformable continuum is represented by the plurality of particles into the ellipsoidal shape, based on the amount of deformation of each of the plurality of particles. Then, the simulation device 10 calculates the reaction force between the particles based on the potential region of each of the plurality of particles deformed into the ellipsoidal shape. According to the simulation device 10 according to this embodiment, even when the particles are deformed such that the distance between the particles increases, the potential regions of the particles overlap each other. Therefore, according to the simulation device 10 of this embodiment, the occurrence of an event in which another particle is infiltrated between the particles is suppressed. Therefore, according to the simulation device 10 of this embodiment, the occurrence of an event in which another particle is disposed in the calculation region is suppressed. Therefore, according to the simulation device 10 of this embodiment, it is possible to perform a numerical calculation simulation for calculating the motion of a continuum with high accuracy.

The simulation device 10 according to this embodiment can deform the spherical potential region of each of a plurality of particles into an ellipsoidal shape using the deformation gradient tensor of each of the plurality of particles.

The simulation device 10 returns the potential region with the ellipsoidal shape to the spherical potential region using reverse conversion represented by Equation (2). Therefore, it is possible to calculate a contact point with a simple method of calculating the relative position vector between two points. As a result, the simulation device 10 can reduce the time required to calculate the contact point.

The apparatus according to the embodiment of this disclosure has been described above, but various other embodiments of the invention may be made. For example, among the processes described in the embodiment, some or all of the processes which are automatically performed may be manually performed.

Furthermore, each step described in the processes according to the embodiment may be arbitrarily divided or combined, depending on various loads or usage conditions. In addition, the steps may be skipped.

The order of the steps described in the processes according to the embodiment may be changed, depending on various loads or usage conditions.

The drawings are conceptual diagrams illustrating the functions of each component of the apparatus, and the components are not necessarily physically configured as illustrated in the drawings. That is, the detailed form of the dispersion and integration of the apparatus is not limited to that illustrated in the drawings, but some or all of the components of the apparatus may be functionally or physically dispersed and integrated in an arbitrary unit, depending on various loads or usage conditions.

Simulation Program

A computer system, such as a personal computer or a workstation, executes a program which is prepared in advance to implement the simulation process of the simulation device 10. Next, an example of a computer which executes a simulation program having the same function as the simulation device 10 will be described with reference to FIG. 7.

Figure 7:
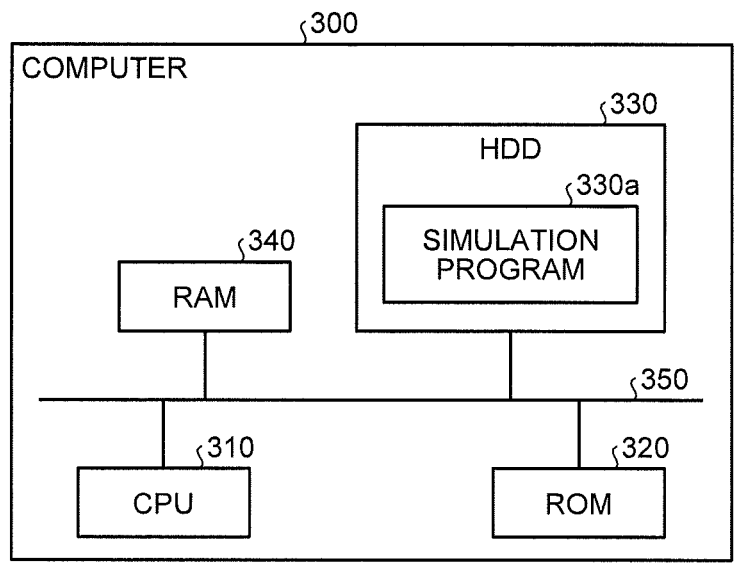
FIG. 7 is a diagram illustrating a computer which executes a simulation program.
Figure 8:
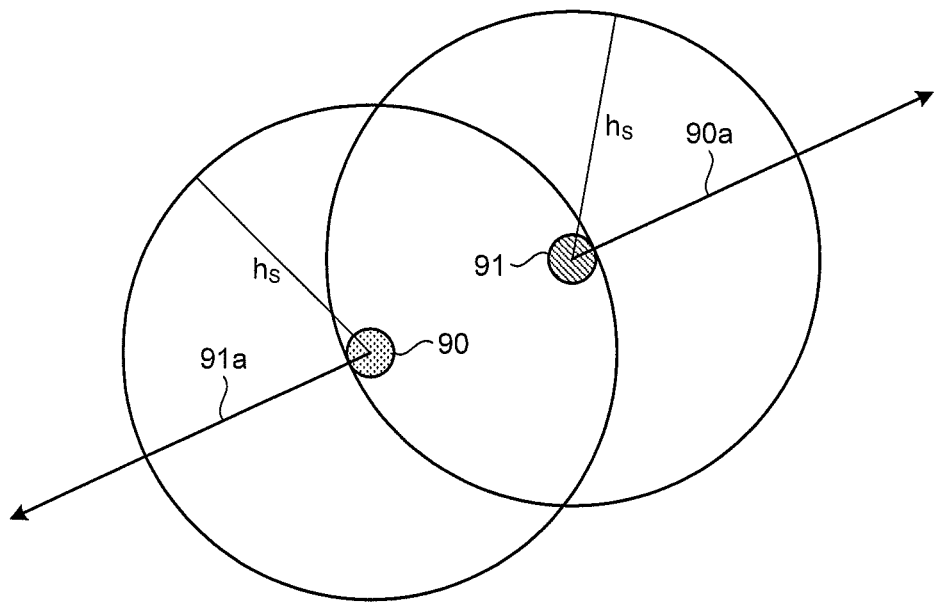
FIG. 8 is a diagram illustrating an example of reaction force calculated by the conventional particle method.
Figure 9:
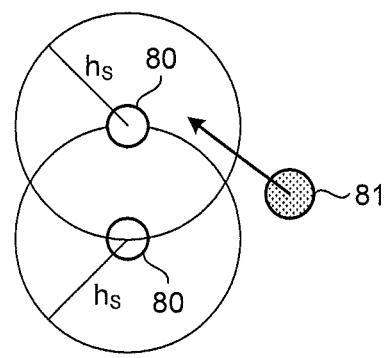
FIG. 9 is a diagram illustrating an example of the problems of the conventional particle method.
Figure 10:
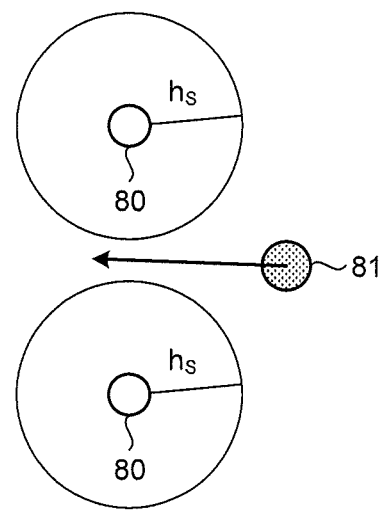
FIG. 10 is a diagram illustrating an example of the problems of the conventional particle method.

FIG. 7 is a diagram illustrating the computer which executes the simulation program. As illustrated in FIG. 7, a computer 300 includes a central processing unit (CPU) 310, a read only memory (ROM) 320, a hard disk drive (HDD) 330, and a random access memory (RAM) 340. These units 300 to 340 are connected to each other through a bus 350.

The HDD 330 stores in advance a simulation program 330a which is executed to implement the same functions as those of the calculation unit 14a, the deformation unit 14b, and the display control unit 14c illustrated in the embodiment described above. The simulation program 330a may be appropriately separated.

The CPU 310 reads the simulation program 330a from the HDD 330 and executes the simulation program 330a.

The HDD 330 stores the deformation model data stored in the storage unit 13 illustrated in FIG. 1.

The CPU 310 reads data from the HDD 330 and stores the data in the RAM 340. In addition, the CPU 310 executes the simulation program 330a using various kinds of data stored in the RAM 340. All of the data stored in the RAM 340 may not constantly be stored in the RAM 340, but only a portion of the data which is used in the process may be stored in the RAM 340.

The simulation program 330a may not be stored in the HDD 330 in advance.

For example, the program is stored in a "portable physical medium", such as a flexible disk (FD), a CD-ROM, a DVD disk, a magneto-optical disk, or an IC card, which is inserted into the computer 300. Then, the computer 300 may read the program from the portable physical medium and execute the read program.

In addition, the program is stored in "another computer (or a server)" connected to the computer 300 through a public line, the Internet, a LAN, or a WAN. Then, the computer 300 may read the program from another computer and execute the read program.

According to an aspect of an embodiment, it is possible to perform a numerical calculation simulation for calculating the motion of a continuum with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a simulation program that causes a computer to perform a process comprising:
    storing in a memory data indicating a model in which a deformable continuum is represented by a plurality of particles;
    receiving an input of an initial value of each of the plurality of particles;
    deforming a spherical potential region of each of the plurality of particles into an ellipsoidal potential region based on an amount of deformation of each of the plurality of particles; and
    calculating reaction force between the plurality of particles based on the ellipsoidal potential region of each of the plurality of particles.

2. The non-transitory computer-readable recording medium according to claim 1,
    wherein, the deforming deforms the spherical potential region of each of the plurality of particles into the ellipsoidal potential region, using a deformation gradient tensor of each of the plurality of particles.

3. A simulation method that causes a computer to perform:
    storing in a memory data indicating a model in which a deformable continuum is represented by a plurality of particles;
    receiving an input of an initial value of each of the plurality of particles;
    deforming a spherical potential region of each of the plurality of particles into an ellipsoidal potential region based on an amount of deformation of each of the plurality of particles; and
    calculating reaction force between the plurality of particles based on the ellipsoidal potential region of each of the plurality of particles.

4. A simulation device comprising:
    a memory that stores therein data indicating a model in which a deformable continuum is represented by a plurality of particles; and
    a processor coupled to the memory and executes a process comprising:
    receiving an input of an initial value of each of the plurality of particles;
    deforming a spherical potential region of each of the plurality of particles into an ellipsoidal potential region based on an amount of deformation of each of the plurality of particles; and
    a calculation unit that calculates reaction force between the plurality of particles based on the ellipsoidal potential region of each of the plurality of particles.

5. The non-transitory computer-readable recording medium according to claim 2 wherein the deforming comprises:
    selecting a first particle and a second particle from among the plurality of particles,
    calculating a relative position vector of the first particle relative to the second particle in a coordinate system before deformation using the deformation gradient tensor of the first particle; and
    deforming the spherical potential region of the first particle into the ellipsoidal potential region based on the calculated relative position vector; and wherein
    the calculating calculates the reaction force between the first particle and the second particle based on the ellipsoidal potential region obtained in the deforming.

* * * * *